April 30, 1935.  A. Z. MAMPLE  1,999,771
APPARATUS FOR TESTING INTEGRITY OF LEAD SHEATHED CABLES
Filed June 20, 1931  2 Sheets-Sheet 1
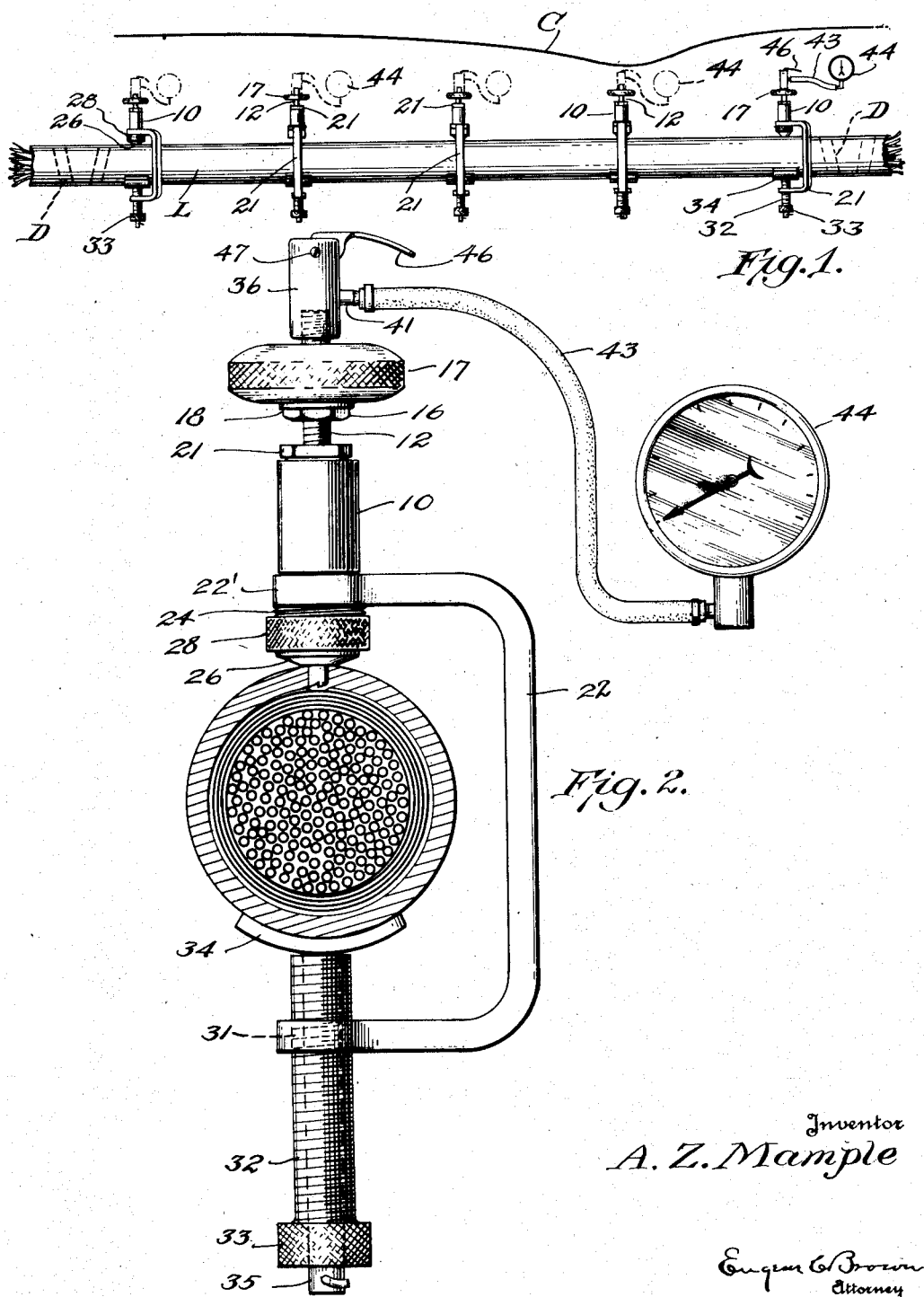
Inventor
A. Z. Mample
Eugene C. Brown
Attorney

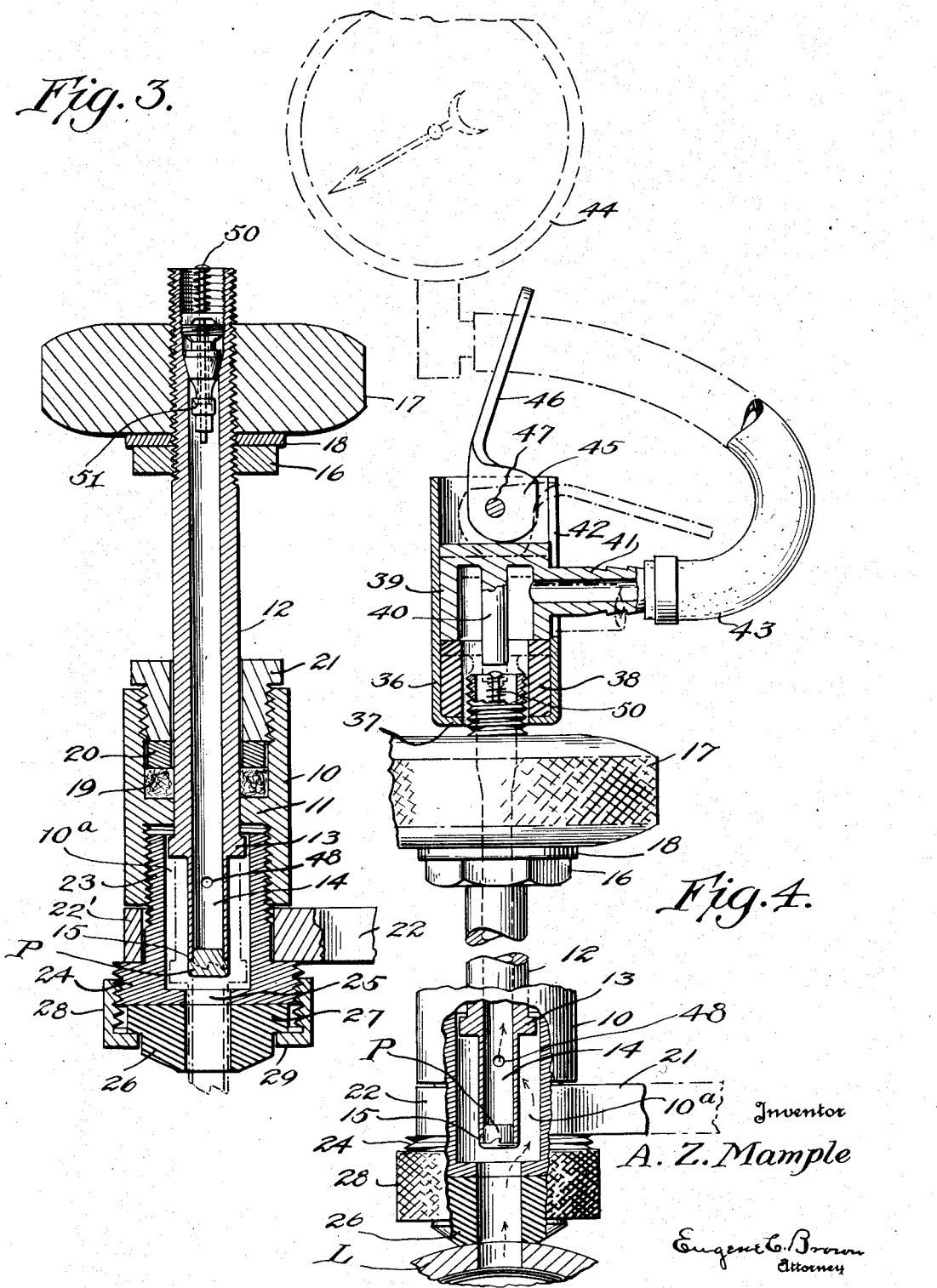

Patented Apr. 30, 1935

1,999,771

UNITED STATES PATENT OFFICE 1,999,771

APPARATUS FOR TESTING INTEGRITY OF LEAD SHEATHED CABLES

Adolph Z. Mample, Glen Rock, N. J., assignor to The Western Union Telegraph Company, New York, N. Y., a corporation of New York Application June 20, 1931, Serial No. 545,782

3 Claims. (Cl. 137—77)

This invention relates to the testing of lead sheathed cables for the purpose of detecting the presence and location of leaks in the sheaths of such cables and has special reference to an apparatus for connecting a pressure gage to a cable.

In testing the integrity of lead sheathed telegraph and telephone cables it is customary to segregate the length of cable to be tested from the remainder of the cable by forcing dam material into the cable at each end of the length to be tested. This may be done by inserting the material in the manner set forth in my prior Patent No. 1,769,524, dated July 1, 1930. The rate of pressure drop is noted at the several gage points. If it becomes necessary to locate a leak more closely by tapping additional holes in the cable near the point of greatest drop, the gas in the cable is lost to a great extent and it becomes necessary to again apply gas to the cable. This causes loss of time and adds to the expense of testing.

Among the objects of the invention are the provision of a method of quickly testing a cable for leaks; to provide an improved means for tapping a cable and attaching a gage thereto with no appreciable loss of gas pressure; and to provide means for applying a single gage to a number of places along the cable without appreciable loss of gas pressure from the cable.

In the following description of my method of testing cables and apparatus therefor, I shall refer to the accompanying drawings, in which—

Figure 1 is a side elevation of a cable under test in accordance with my invention.

Figure 2 is an enlarged transverse section through the cable showing one of the testing devices applied thereto.

Figure 3 is a vertical diametrical section through the upper part of the cable tapping device, the gage being detached.

Figure 4 is a similar view partly in elevation, showing the device applied to a cable and having the gage attached.

In the embodiment here illustrated a hollow cylindrical stuffing box 10 is provided intermediate its ends with an internal flange 11, which forms a guide opening for a combination valve stem and cable boring punch. This latter has a relatively thick walled tubular body 12 slidably fitting the opening formed by the flange 11. A collar 13 is formed on the lower end of the body 12 and serves to limit upward movement of the punch through the stuffing box 10 by engagement with the flange 11. A relatively thin walled tubular punch 14 extends downwardly from the collar and forms the lower end of the punch. This punch is provided with teeth 15 and thus forms a hollow member to receive a plug removed from the cable. A nut 16 is screwed on the upper end of the body 12 and a handle 17 is also screwed on this end above the nut, a locking washer 18 being interposed between the handle and nut so that by screwing the nut and handle toward each other, the latter is secured on the body 12 against rotation under conditions of use.

A packing 19 is fitted around the body 12 in the stuffing box and rests on the flange 11. A packing ring 20 rests on this packing and a packing ring nut 21 surrounds the body 12 and is screwed into the upper end of the stuffing box to bear against the packing ring and force the latter downwardly, so that the packing 19 is compressed against the body 12 and flange 11 and prevents escape of air or gas from the lower part 10$^a$ constituting the closed chamber of the stuffing box around the body 12.

A U-shaped frame 22 is provided at its upper end with an eye 22' of substantially the same external diameter as the stuffing box. A washer support having a tubular body 23, passes through this eye and is screwed into the lower end of the stuffing box 10. An externally threaded flange 24 is formed on the lower end of the body 23, the washer support thus forming a means for securing the stuffing box to the frame. This washer support is of such internal diameter as to permit movement of the collar 13 therein and is closed at its lower end except for a central opening 25 of sufficient size to permit free passage of the punch 14. A tubular rubber washer 26 is seated against the lower end of the washer support and is provided with a flange 27 at its upper end. A washer clamp nut 28 is screwed on the flange 24 and is provided at its lower end with an internal flange 29 which engages beneath the flange 27 and thus holds the rubber washer against the washer support. The rubber washer has a central opening 30 of proper size to permit free passage of the boring punch 14.

A threaded eye 31 is provided at the extremity of the lower arm of the frame 21 and receives a hollow clamping screw 32 having at its lower end an operating handle 33. An arcuate cable shoe 34 rests on the upper end of the screw 32 and is provided with a stem 35 which extends downwardly through the screw. A cotter pin 36 passes through the projecting lower end of the screw and serves to hold the saddle from accidental disengagement.

A gage tube connection is provided for use with this device and comprises a shell 36 having an internal flange 37 at its lower end, of such size as to permit this lower end to be fitted over the upper end of the tubular body 12, which projects above the handle 17. A rubber gasket 38 is fitted in the bottom of the shell and is supported on the flange 37. Mounted in the shell is a piston 39, open at its bottom and having a stem 40 depending from its inner top wall and extending below its bottom edge. A nipple 41 projects laterally from the piston through a slot 42 formed in the shell wall, so that the piston may slide in the shell. A pressure gage may be connected to this nipple in any suitable manner, as by a flexible tube 43. A cam 45 having an operating arm or handle 46 is mounted in the upper end of the shell and is supported by a pin 47 in such manner that raising of the handle 46 allows the piston to rise and release the gasket 38 from compression, while depressing the handle 46 to the dotted line position in Figure 4 depresses the piston and causes compression of the gasket so that the latter firmly grips the upper end of the body 12, thus forming a gas tight seal between the punch and the hollow piston. Ports 48 are formed in the side wall of the punch. An inwardly opening check valve 49, of automobile tire type, is fixed in the upper end of the body 12 in position to have its stem 50 engaged by the stem 40 to open the valve.

When the sheath of a section of cable is to be tested for leaks after having been placed under a certain gas pressure, one of my testing devices is applied to the cable in the manner shown in Fig. 1, the screw 32 being screwed tightly to compress the rubber washer 26 against the cable sheath, forming a gas-tight seal. The punch is then forced down upon the sheath and rotated by means of the handle 17 until the serrated bottom edge has penetrated the lead and removed a plug P therefrom. The soft lead flows into the lower end of the punch as it is rotated, fitting tightly therein so that the metal is finally sheared off just before the teeth pierce the inner wall of the sheath. The teeth of the tool, therefore, never pierce the inner wall of the sheath and the thin lead flange which extends under the teeth of the tool is sheared off at the outer edge and is withdrawn with the plug as the tool is retracted in the manner indicated in Fig. 4. Due to this fact, the insulation and conductors in the cable are protected from any injury.

When the punch stem or body is drawn upwardly into the position indicated in Fig. 4, withdrawing the lead plug P, the gas under pressure in the cable then flows through the apertures 48 in the punch wall into the bore of the punch, the upper end of the punch being closed by the tire valve 51. The hollow punch thus serves as a valved outlet for the chamber 10ᵃ.

A number of temporary valve connections are made in this manner at suitable distances apart. A pressure gage may then be applied successively to the valved stems 12, and the readings noted. The curve plotted from these readings will show a drop in pressure more or less gradual increasing more rapidly and in case of a large leak, abruptly dropping when very close to the leak, and then rising again when receding upon the other side of the leak, as indicated graphically by the curve C in Fig. 1. By reason of the facility with which these valved devices may be clamped to the cable, additional connections may be made in the immediate proximity of the leak to accurately locate it.

The use of the gage tube connector 36 is very efficient and very convenient but it is evident that the gage may be momentarily connected to the valve end of the stem 12 in other ways to secure a pressure reading. One of the advantages which my method of quickly applying a temporary valved connection to the cable sheath resides in the fact that this may be done after gas pressure has been applied to the cable and yet without the loss of any appreciable pressure. This has not heretofore been possible and will be appreciated especially by telegraph and telephone engineers. By reason of the superior electrical characteristics of paper insulated conductors, this type of cable is very desirable, but on account of the rapid loss of insulating properties when any moisture is present, it becomes of prime importance to quickly detect any leaks and to locate their exact position as soon as possible.

When the test has been completed, the valved connectors may be readily removed and the apertures closed either by nipples or other suitable closures.

I claim:

1. In an apparatus for testing the integrity of lead sheathed electrical conductor cables, a stuffing box having an open end and provided centrally with a tool guiding journal, means to secure the stuffing box on a cable with an interposed seal between the open end and the cable, a tubular hole forming tool extending into said stuffing box and mounted for slidable and rotatable movement through said journal, a packing tightly surrounding the tool in the end of the stuffing box remote from the cable, and a valved member in the outer end of said tubular tool provided with means for attachment to a pressure gage.

2. In an apparatus for testing the integrity of lead sheathed electrical conductor cables, a stuffing box having an open end and provided centrally with an internal tool guiding journal, an elastic packing means carried by the lower end of the stuffing box to seat on a cable and seal the box thereto, a tubular tool mounted to rotate and slide in the journal and adapted to first form and then remove a plug from the cable sheath without piercing the inner surface of the sheath, a member at the outer end of the tool provided with a valve and with means to open said valve to establish communication with the interior of the cable sheath through the aperture formed by the removal of said plug.

3. An apparatus for securing a gage reading of the gas pressure within a lead sheathed electrical conductor cable, comprising a tubular valved clamping means for securing a gage-connection to the surface of the lead cable sheath, means for withdrawing a disk from the sheath into the bore of said tubular clamping means and means for actuating said valve to establish communication between the interior of the cable and said gage connection.

ADOLPH Z. MAMPLE.